Patented July 28, 1936

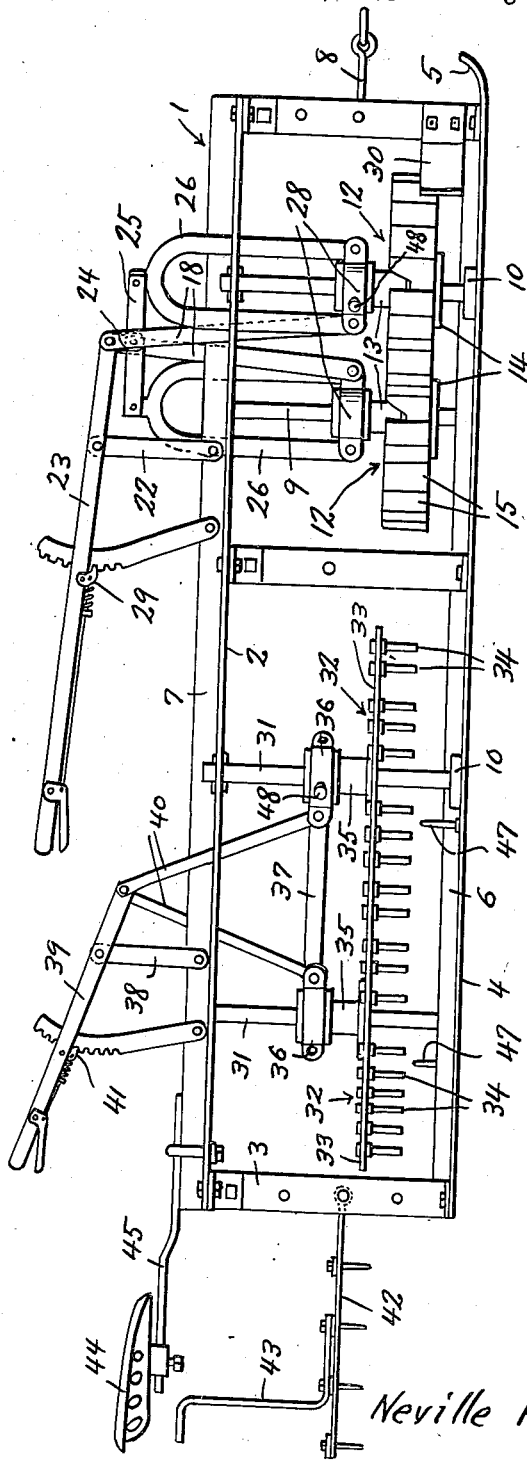

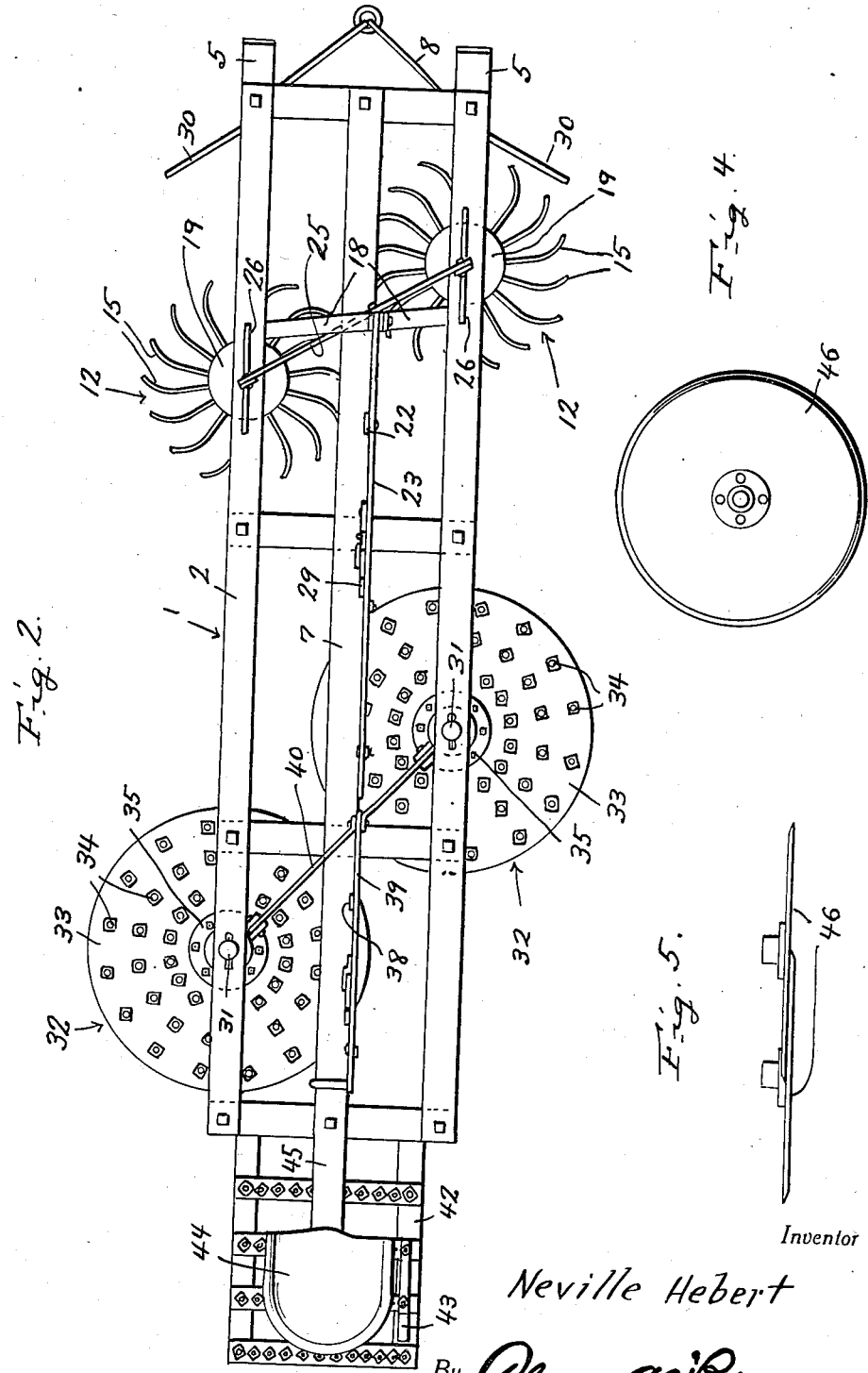

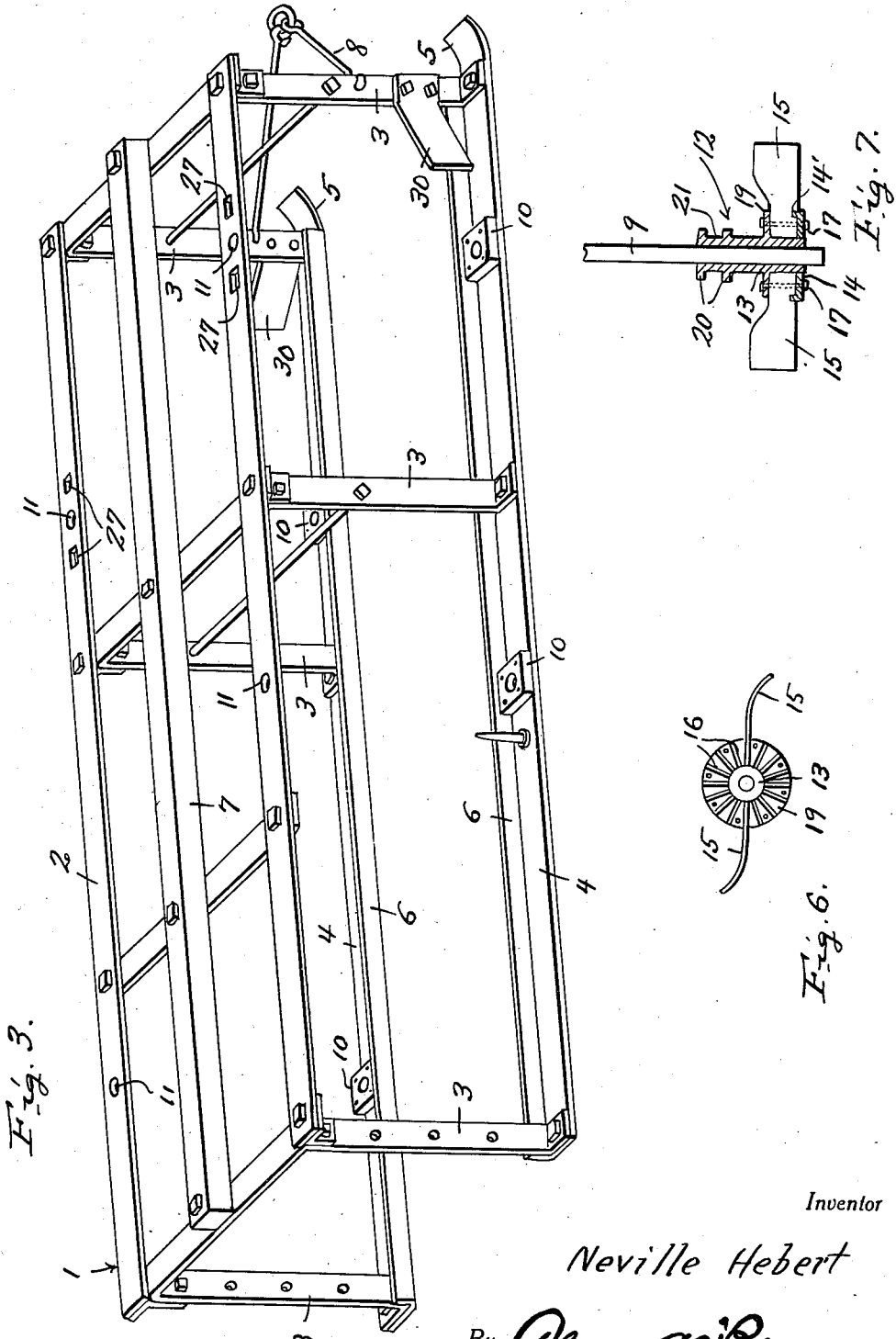

2,049,203

UNITED STATES PATENT OFFICE 2,049,203

AGRICULTURAL IMPLEMENT

Neville Hebert, Jeanerette, La.

Application February 15, 1936, Serial No. 64,142

5 Claims. (Cl. 55—13)

The present invention relates to new and useful improvements in agricultural implements particularly for scraping and harrowing ground which has been planted in sugar cane but it will be understood, of course, that a machine in accordance with this invention may be used for any purpose for which it is found adapted and desirable.

An important object of the invention is to provide, in a manner as hereinafter set forth, an agricultural implement of the aforementioned character embodying a novel combination and arrangement of ground engaging elements mounted for rotation in a horizontal plane, together with novel means through the medium of which said elements may be conveniently adjusted vertically as desired.

Another very important object of the invention is to provide an agricultural implement of the character described comprising rotary scraper elements or units of a novel construction.

Still another important object of the invention is to provide an agricultural implement of the character set forth wherein stubble cutting disks may be expeditiously substituted for the rotary scrapers.

Other objects of the invention are to provide an agricultural implement or machine of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views and wherein:—

Figure 1 is a view in side elevation of an agricultural implement constructed in accordance with the present invention.

Figure 2 is a view in top plan thereof.

Figure 3 is a perspective view of the frame.

Figure 4 is a detail view in plan of one of the cutting disks which may be used.

Figure 5 is a view in front elevation of a pair of the cutting disks.

Figure 6 is a detail view in bottom plan of the upper member of the hub portion of one of the rotary scrapers, showing two of the blades mounted thereon.

Figure 7 is a view in vertical section through one of the rotary scrapers.

Referring now to the drawings in detail, it will be seen that the embodiment of the invention which has been illustrated comprises a substantially U-shaped frame which is designated generally by the reference numeral 1, said frame being of metal and including a top structure 2 mounted on legs 3 which rise from runners 4, said runners including upwardly curved forward end portions 5 and further including upturned flanges 6 on their inner edges. Mounted longitudinally on the top structure 2 of the frame 1 is a bar 7. On the forward end of the frame 1 suitable means 8 is provided for connection with a suitable source of power.

Extending vertically between the forward portions of the runners 4 and the top structure 2 of the frame 1 is a pair of shafts 9 which are arranged diagonally with respect to each other. The lower end portions of the shafts 9 are engaged in openings which are provided therefor in blocks 10 which are fixed on the runners 4 and the upper end portions of said shafts extend through openings 11 which are provided therefor in the top structure 2. Rotatably and slidably mounted on the shafts 9 are scrapers which are designated generally by the reference numeral 12. Each scraper 12 comprises a hub 13 provided, at an intermediate point, with a flange 19. Slidably mounted on the lower end portion of the hub 13 is a disk 14. The reduced inner end portions of radiating blades 15 are clamped between the flange 19 and the disk 14 by bolts 17, the inner ends of said blades abutting the hub 13. The lower face of the flange 19 is provided with radial grooves 16 for the reception of the blades 15. On the upper end portion of the hub 13 are spaced circumferential ribs or the like 20 providing a channel 21.

Pivotally mounted on the bar 7 and rising therefrom is a bracket 22 on the upper end of which a hand lever 23 is pivotally mounted at an intermediate point. Mounted on one end of the lever 23, through the medium of a link 24, is a horizontal bar 25. Yokes 26 depend from the end portions of the bar 25 and extend slidably through openings 27 which are provided therefor in the top structure 2 of the frame 1. The yokes 26 straddle the vertical shafts 9 and are rotatably connected at their lower ends to the scrapers 12 by means 28 engaged in the grooves or channels 21. Suitable latching means 29 is provided for releasably securing the lever 23 in adjusted position. Braces 18 are connected to the means 28 for maintaining the scrapers 12 in the same horizontal plane at all times. Guards 30 project outwardly and rearwardly from the forward end portion of the frame 1 adjacent the scrapers 12.

Arranged diagonally with respect to each other on the rear portion of the frame 1 is a pair of vertical shafts 31 which are mounted in a manner similar to the shafts 9. Rotatably and slidably mounted on the shafts 31 are harrows which are designated generally by the reference numeral 32. The harrows 32 comprise disks 33 in which suitable teeth 34 are mounted. The harrows 32 further include upstanding hub portions 35 having formed therein annular grooves in which collars 36 are rotatably engaged. The collars 36 are mounted on the end portions of the connecting bar 37. Pivotally mounted on the rear portion of the bar 7 and rising therefrom is a bracket 38 on which a hand lever 39 is pivotally mounted at an intermediate point. Links 40 connect one end of the lever 39 with the ends of the bar 37. A suitable latch 41 is provided for releasably securing the lever 39 in adjusted position. Pins 47 rise from the runners 6 rearwardly of the shafts 31 for preventing the rotary harrows 32 from wrapping grass and weeds around said shafts.

Mounted for swinging movement in a vertical plane on the rear end of the frame 1 is a harrow 42 from which a handle 43 rises. Mounted above the harrow 42 on the rear end of the frame 1 is an operator's seat 44. The seat 44 is mounted for longitudinal adjustment on a supporting bar 45 which extends rearwardly from the frame 1.

Referring now to Figures 4 and 5 of the drawings, it will be seen that the reference numeral 46 designates cane stubble cutting disks which may be substituted for the scrapers 12 on the shafts 9.

In operation, the substantially U-shaped frame 1 straddles the row. As the machine travels forwardly the blades 15 of the scrapers 12 enter the row from the sides thereof, said blades being thus caused to rotate on the shafts 9. It may be well to here state that the scrapers 12 rotate in opposite directions. In this manner the earth is thoroughly loosened. The harrows 32 also rotate in opposite directions as the machine travels over the ground and said harrows remove grass and weeds which have been loosened by the scrapers 12. Of course, the scrapers 12 and the harrows 32 are adjusted vertically as desired through the medium of the hand levers 23 and 39, respectively. The small harrow 42 on the rear end of the frame 1 is for the purpose of removing any grass, weeds, etc., that may be left by the rotary harrows 32. The reference numeral 48 designates grease cups mounted on the connecting means 28 and 36. An upstanding flange 14' is provided on the disks 14 and engaged in notches provided therefor in the lower edges of the blades 15 for anchoring said blades in the hubs.

It is believed that the many advantages of an agricultural implement constructed in accordance with the present invention will be readily understood, and although a preferred embodiment of the machine is as illustrated and described, it is to be understood that changes in the details of construction and in the combination and arrangement of parts may be resorted to which will fall within the scope of the invention as claimed.

What is claimed is:—

1. A machine of the class described comprising a substantially U-shaped frame including a pair of runners, front and rear pairs of shafts mounted vertically on the frame, scrapers rotatably and slidably mounted on certain of the shafts, harrows rotatably mounted on the other shafts, means for adjusting the scrapers vertically, means for adjusting the harrows vertically, and a harrow mounted for swinging movement in a vertical plane on the rear end of the frame and extending rearwardly therefrom.

2. An agricultural implement of the class described comprising a pair of runners, a substantially U-shaped frame mounted on said runners, front and rear pairs of shafts extending vertically between the runners and the upper portion of the frame, scraping wheels rotatably and slidably mounted on the front shafts, and harrows rotatably and slidably mounted on the rear shafts.

3. An agricultural implement of the class described comprising a frame, shafts mounted vertically on said frame, scraping wheels rotatably and slidably mounted on said shafts, said scraping wheels including upstanding hub portions having annular grooves therein, yokes mounted for vertical sliding movement in the frame and straddling the shafts, means on the yokes rotatably engaged in the grooves for connecting said yokes to the scraping wheels, a hand lever pivotally mounted on the frame, and means operatively connecting said hand lever to the yokes for raising and lowering the scraping wheels.

4. An agricultural implement of the class described comprising a frame, vertical shafts mounted on said frame, scraping wheels rotatably and slidably mounted on said shafts, each scraping wheel comprising a hub including a flange at an intermediate point, said flange having radial grooves therein, a disk slidably mounted on the hub below the flange, radial blades engaged between the flange and the disk, means for drawing the disk and flange together for clamping the blades therebetween, said blades being engaged in the radial grooves and having their inner ends engaged with the hub, and means for raising and lowering the scraping wheels on the shafts.

5. An agricultural implement of the class described comprising a pair of runners, a substantially U-shaped frame mounted on said runners, shafts extending vertically between the runners and the top portion of the frame, harrows rotatably and slidably mounted on the shafts, said harrows including disks, teeth mounted in the disks and hub portions rising centrally from said disks, a hand lever pivotally mounted on the frame and means rotatably connecting said hand lever to the hub portions of the harrows for raising and lowering said harrows.

NEVILLE HEBERT.